(12) United States Patent
Yüksel Durmaz et al.

(10) Patent No.: US 12,544,454 B2
(45) Date of Patent: Feb. 10, 2026

(54) REDUCED GRAPHENE OXIDE (rGO) BASED DRUG CARRIER SYSTEMS

(71) Applicant: Istanbul Medipol Universitesi Teknoloji Transfer Ofisi Anonim Sirketi, Istanbul (TR)

(72) Inventors: Yasemin Yüksel Durmaz, Istanbul (TR); Erhan Demirel, Istanbul (TR)

(*) Notice: Subject to any disclaimer, the term of this patent is extended or adjusted under 35 U.S.C. 154(b) by 315 days.

(21) Appl. No.: 18/259,346

(22) PCT Filed: Dec. 24, 2021

(86) PCT No.: PCT/TR2021/051502
§ 371 (c)(1),
(2) Date: Jun. 26, 2023

(87) PCT Pub. No.: WO2022/146360
PCT Pub. Date: Jul. 7, 2022

(65) Prior Publication Data
US 2024/0075162 A1 Mar. 7, 2024

(30) Foreign Application Priority Data
Dec. 29, 2020 (TR) ................... 2020/22280

(51) Int. Cl.
*A61K 47/69* (2017.01)
*A61K 9/14* (2006.01)
*A61K 31/704* (2006.01)
*A61P 35/00* (2006.01)
*C08K 3/04* (2006.01)

(52) U.S. Cl.
CPC ......... *A61K 47/6933* (2017.08); *A61K 9/145* (2013.01); *A61K 31/704* (2013.01); *A61P 35/00* (2018.01); *C08K 3/042* (2017.05)

(58) Field of Classification Search
None
See application file for complete search history.

(56) References Cited

U.S. PATENT DOCUMENTS

2008/0020052 A1* 1/2008 Li ...................... A61K 9/1652
424/490

FOREIGN PATENT DOCUMENTS

WO WO-2016114634 A2 * 7/2016 ............ A61K 47/50
WO WO-2018088978 A1 * 5/2018 ............ A61L 27/34

OTHER PUBLICATIONS

Mark Long, Suzanne H. Rogers, David W. Thornthwaite, Francis R. Livens and Steve p. Rannard. "Monitoring Atom Transfer Radical Polymerisation using 14C-radiolabelled initiators." Polymer Chemistry, vol. 2, 2011, pp. 581-588. (Year: 2011).*
English Translation of WO 2016/114634 A2. Translation obtained on Jul. 2, 2025. Originally published in Korean on Jul. 21, 2016, 27 printed pages. (Year: 2016).*
International Search Report for corresponding PCT/TR2021/051502 dated Apr. 12, 2023.
(Continued)

*Primary Examiner* — Isaac Shomer
(74) *Attorney, Agent, or Firm* — Egbert, McDaniel & Swartz, PLLC

(57) ABSTRACT

The present invention is related to reduced graphene oxide (rGO) nanoplatforms coated with a methacrylate-based copolymer and the methods used in the preparation of these platforms for use as a drug carrier system.

8 Claims, 2 Drawing Sheets

(56) References Cited

OTHER PUBLICATIONS

Figure 1:
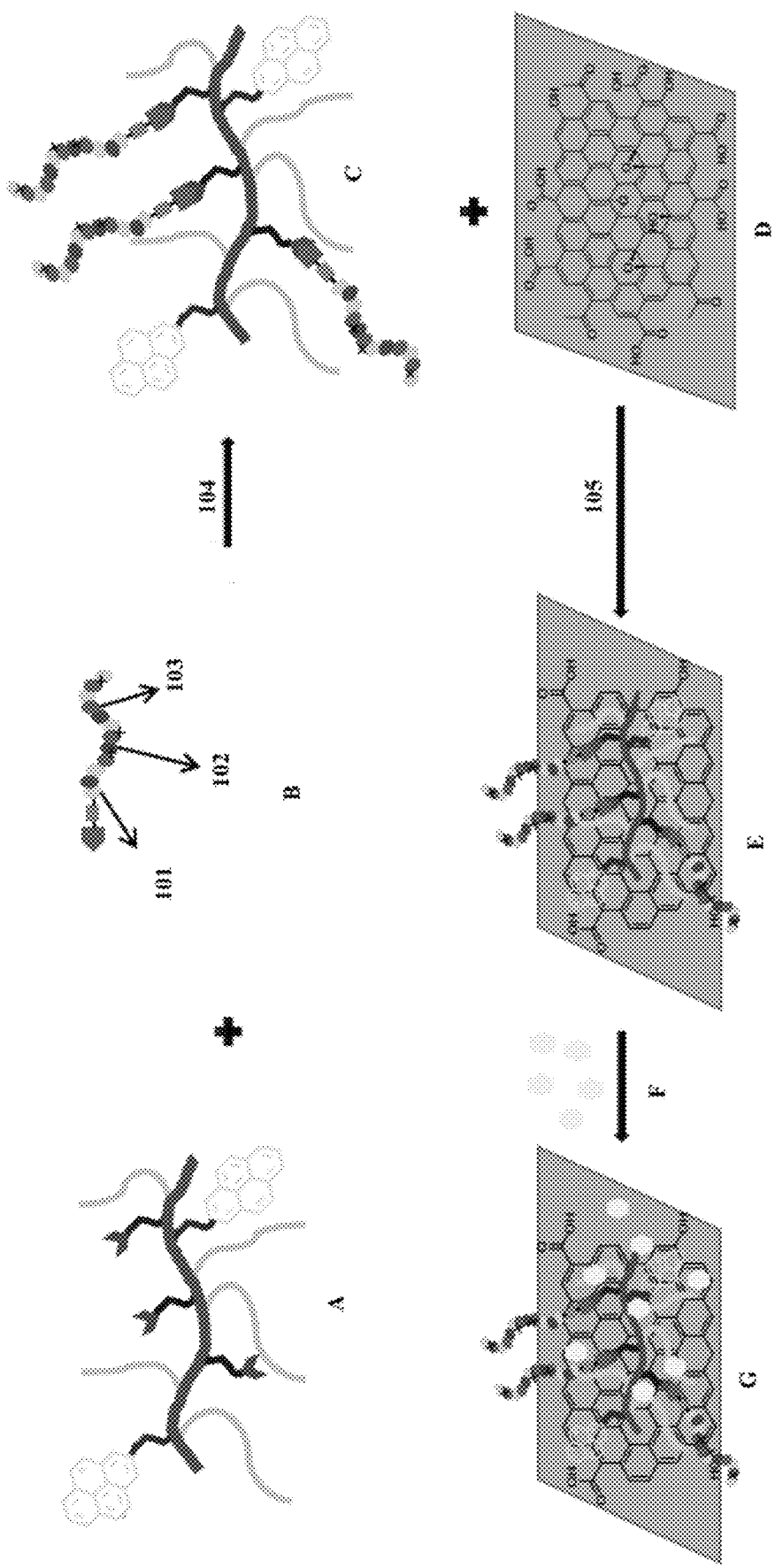

Written Opinion of the International Searching Authority for corresponding PCT/TR2021/051502 dated Apr. 12, 2023.

Lu Yu-Jen; Lin Pin-Yi; Huang Pei-Han; Kuo Chang-Yi; Shalumon K T; Chen Mao-Yu; Chen Jyh-Ping, "Magnetic Graphene Oxide for Dual Targeted Delivery of Doxorubicin and Photothermal Therapy", Nanomaterials, 2018. doi:10.3390/nano8040193 pubmed:29584656.

Zheng Xin Ting; Ma Xiao Qing; Li Chang Ming, "Highly efficient nuclear delivery of anti-cancer drugs using a bio-functionalized reduced graphene oxide", Journal of Colloid and Interface Science, 2015. doi:10.1016/j.jcis.2015.12.052 pubmed:26773607.

Hazhir N; Chekin F; Raoof J B; "A porous reduced graphene oxide/chitosan-based nanocarrier as a delivery system of doxorubicin", RSC advances, 2019. doi: 10.1039/c9ra04977k pubmed:35529364.

Liu Xiao; Wu Xu; Xing Yuqian; Zhang Ying; Zhang Xuefei; Pu Qinqin; Wu Min; Zhao Julia Xiaojun; "Reduced Graphene Oxide/ Mesoporous Silica Nanocarriers for pH-Triggered Drug Release and Photothermal Therapy", ACS Applied Bio Materials, 2020. doi: 10.1021/acsabm.9b01108 pubmed:35025390.

\* cited by examiner

REDUCED GRAPHENE OXIDE (rGO) BASED DRUG CARRIER SYSTEMS

The present invention is related to reduced graphene oxide (rGO) nanoplatforms coated with a methacrylate-based copolymer and the methods used in the preparation of these platforms for use as a drug carrier system.

PRIOR ART

The superior qualities of graphene (G) compared to other known biomaterials have made it an important material in the carrying of anticancer agents, genes, or peptides. However, the toxic effect of graphene is limiting its use. Graphene has a single-layer structure; on the other hand, Graphene oxide (GO), which is a similar structure, has both a multi-layer structure and contains a great number of functional oxygen groups on its structure, which renders it hydrophilic. However, due to the $sp^3$ a hybridized carbons in the GO structure, this material has an imperfect surface formation. By decreasing the oxygen group on the GO, this problem may be eliminated, however, in this case, the solubility of the obtained material partially decreases.

The reduced graphene oxide (rGO) which is obtained by the reducing of the oxygen-rich groups on the graphene surface has a more even and wide surface area. In addition, it has lower toxicity compared to graphene. With these aspects, rGO becomes an appealing agent for use in biological applications. However, the fact that it has a low water solubility and low biocompatibility limit its use.

In the known state of the art, to overcome rGO's solubility and biocompatibility problem, the surface-coating process is frequently applied on the rGO surface with polymers such as poly(ethylene glycol) (PEG). In this manner, excretion of the modified rGO from the liver and spleen by immune cells is prevented, and therefore, the blood circulation time is prolonged.

A different modification cannot be made on rGO's coated with PEG and similar polymers in this manner. Therefore, even though the bioavailability of rGO is increased, its use in drug carrying, etc. applications becomes more difficult.

Starting out to solve this problem, the inventors aim to develop a modular nanocarrier that provides for the carrying of a cargo molecule such as a drug, etc., while increasing the bioavailability of rGO.

DETAILED DESCRIPTION OF THE DRAWINGS

FIG. 1: Diagram shows the coating of in-situ PAMP-graft-PHDT polymer on graphene oxide, and reduction to rGO.
  A: Functional copolymer, poly[(poly (ethylene glycol) methacrylate)-co-(methyl methacrylate)-co-(1-pirenmethacrylate)-co-(3-azidopropyl methacrylate)] (PAMP)
  B: Cationic copolymer, poly[(hexyl methacrylate)-co-(dimethylaminoethyl methacrylate)-co-(trimethylaminoethyl methacrylate)] (PHDT)
  C: PAMP-graft-PHDT polymer
  D: Graphene Oxide
  E: PAMP-graft-PHDT polymer coated, reduced graphene oxide (rGO) (nanocarrier)
  F: Doxorubicin
  G: Doxorubicin-loaded PAMP-graft-PHDT polymer coated, reduced graphene oxide (rGO) (drug-nanocarrier conjugate)
101: Hydrophobic monomer (HMA)
102: pH-sensitive monomer (DMAEMA)
103: Cationic monomer (TMAEMA)
104: CuAAC, click reaction catalyst
105: π-π interaction and reduction step FIG. 2: Inspection of the effects of carriers complexed with Anti-Bcl-2-siRNA on cell viability by Resazurin assay as a result of 24-hours incubation with MDA-MB-231 breast cancer cells.

Figure 3:
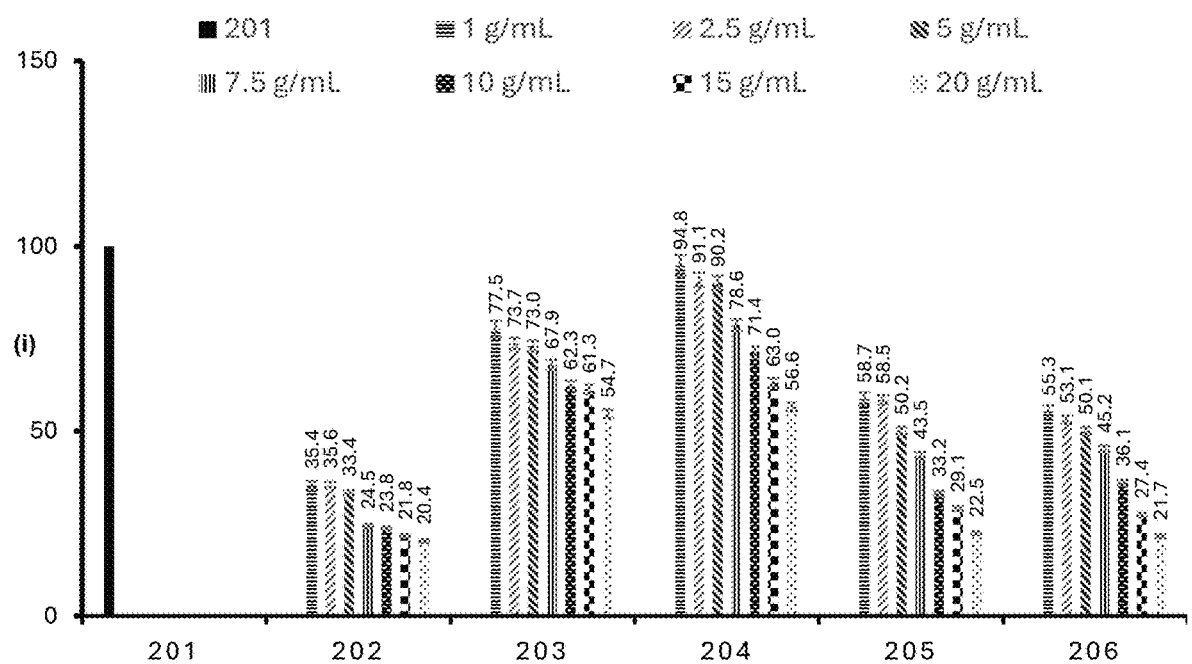

FIG. 3: Inspection of the effects of nanoparticles carrying siRNA on cell viability by Resazurin assay after 48-hours incubation with MDA-MB-231 cells.
  (i): Cell viability (%)
  201: Control
  202: Free Doxorubicin
  203: $(PAMP)_{PEG2000}$-graft-PHDT-rGO-siRNA
  204: $(PAMP)_{PEG2000}$-graft-PHDT-rGO-EPPT1-siRNA
  205: $(PAMP)_{PEG2000}$-graft-PHDT-rGO-Doxorubicin-siRNA
  206: $(PAMP)_{PEG2000}$-graft-PHDT-rGO-EPPT1-Doxorubicin-siRNA

DETAILED DESCRIPTION OF THE INVENTION

The present invention is related to a modular rGO based nanocarrier, characterized in that the surface of the reduced graphene oxide (rGO) is coated with poly[poly (ethylene glycol methacrylate)-co-(methyl methacrylate)-co-(1-pyrenemethacrylate)-co-(3-azidopropyl methacrylate)]-graft-poly[(hexyl methacrylate)-co-(dimethylaminoethyl methacrylate)-co-(trimethylaminoethyl methacrylate)] (PAMP-graft-PHDT) copolymer.

The pyrene groups in the structure of PAMP polymer suitable for the invention provide the attachment of the polymer on the rGO surface with the π-π interaction. PEG groups in the structure of PAMP polymer render the surface of rGO biocompatible. The azide groups on the PAMP polymer render this structure a modular rGO-based nanocarrier by providing for the attachment of various cargo molecules comprising alkyne on the nanocarrier with the click reaction performed at moderate conditions.

The trimethyl aminoethyl methacrylate monomer in the structure of the poly[(hexyl methacrylate)-co-(dimethylaminoethyl methacrylate)-co-(trimethylaminoethyl methacrylate)] polymer named PHDT grafted on the PAMP polymer in a manner suitable for the invention gives the polymer cationic property, which, in the case that the nanocarrier is conjugated with a drug, provides for the transfer of the drug to target region by ensuring the increase of drug release from the surface.

The terms reduced graphene oxide and rGO used within the scope of the invention are equivalent and interchangeable.

The term "rGO based nanocarrier suitable for the invention" used within the scope of the invention means the rGO coated with the poly[poly (ethylene glycol methacrylate)-co-(methyl methacrylate)-co-(1-pyrenemethacrylate)-co-(3-azidopropyl methacrylate)]-graft-poly[(hexyl methacrylate)-co-(dimethylaminoethyl methacrylate)-co-(trimethylaminoethyl methacrylate)] (PAMP-graft-PHDT) copolymer.

The term "PAMP-graft-PHDT polymer coating" mentioned in the invention points to the binding of PAMP-graft-PHDT polymer with the rGO surface with a non-covalent physical interaction and/or adhesion of the same on the rGO surface through π-π interaction.

The term "PAMP" used within the scope of the invention and the term "poly [poly (ethylene glycol methacrylate)-co- (methyl methacrylate)-co-(1-pyrenemethacrylate)-co-(3-azido propyl methacrylate)]" have the same meaning and they are interchangeable.

The term "PHDT" used within the scope of the invention and the term "poly [ (hexyl methacrylate)-co-(dimethylaminoethyl methacrylate)-co-(trimethylaminoethyl methacrylate)]" have the same meaning and they are interchangeable.

A preferred application of the invention is related to an rGO based nanocarrier and characterized in that the surface of the reduced graphene oxide (rGO) is coated with the poly [poly (ethylene glycol methacrylate)-co-(methyl methacrylate)-co-(1-pyrenemethacrylate)-co-(3-azido propyl methacrylate)-graft-poly [(hexyl methacrylate)-co-(dimethylaminoethyl methacrylate)-co-(trimethylaminoethyl methacrylate)] (PAMP-graft-PHDT) copolymer, wherein n is a natural number between 1 to 200 and p, q, r, x, y, a, b, c between 1 to 50, independently.

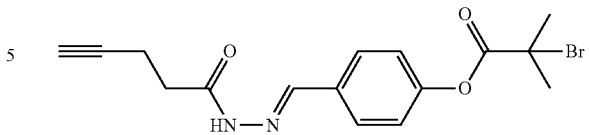

Formula II

In an application of the invention, an rGO-based nanocarrier suitable for the invention can be functionalized with any molecule that has the alkyne group.

In a preferred application of the invention, an rGO based nanocarrier is modified with targeting agents or therapeutic agents that have the alkyne group or that are modified with the alkyne group.

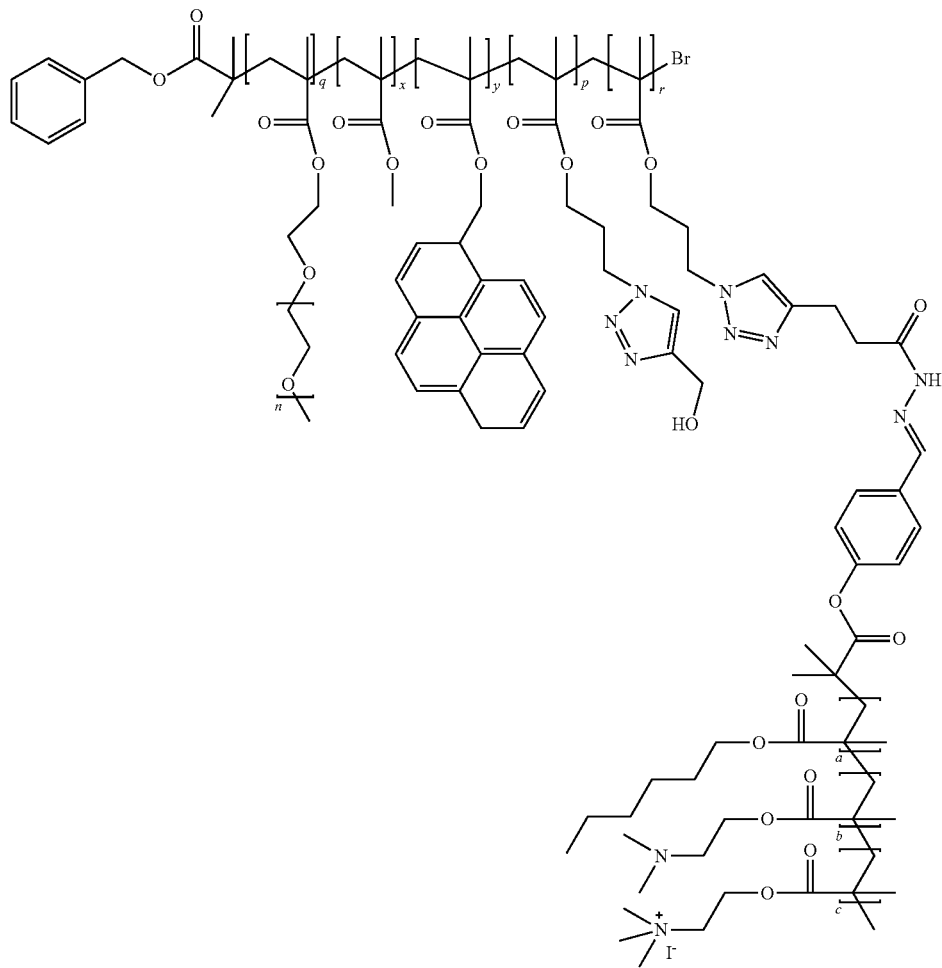

Formula I

In another aspect, the invention is related to the polymerization initiator shown in formula II suitable for use in the preparation of the poly [poly (ethylene glycol methacrylate)-co-(methyl methacrylate)-co-(1-pyrenemethacrylate)-co-(3-azido propyl methacrylate)-graft-poly [(hexyl methacrylate)-co-(dimethylaminoethyl methacrylate)-co-(trimethylaminoethyl methacrylate)] (PAMP-graft-PHDT) copolymer.

The targeting agent mentioned in the invention can be substrates specific to receptors or enzymes that are known to be expressed more in the presence of various diseases, which are present in the known state of the art. In a preferred application of the invention, EPPT1 can be used as a targeting agent.

In another application of the invention, an rGO based nanocarrier suitable for the invention can be modified with an agent that can adhere to the rGO surface with the π-π interaction. The agent that can adhere to the rGO surface with the π-π interaction mentioned in the invention is preferably a therapeutic agent, more preferably an antineoplastic agent such as doxorubicin. Cargo molecules such as doxorubicin that adhere to the rGO surface in a non-covalent manner enter the cell together with the carrier in the target region and show their effect by being released therein.

In another preferred application of the invention, an agent that can adhere to the rGO surface with the π-π interaction can be a targeting agent.

In another application of the invention, an rGO based nanocarrier suitable for the invention can be modified with an agent that can adhere to the rGO surface with ionic interaction. The agent that can adhere to the rGO surface with ionic interaction mentioned in the invention can be a biological molecule such as oligopeptide, polypeptide, DNA or RNA fragment, miRNA, siRNA, ssRNA. In this manner, it is aimed to increase the pharmaceutical efficacy by providing an easier entry of the biological agents and nanocarriers subject to the invention that adhere to the surface of the rGO based nanocarrier into a particular region, e.g. a cancer cell, and releasing the therapeutic agent thereon. In a preferred application of the invention, the suitable rGO based nanocarrier is modified with anti-Bcl-2 siRNA. Here, the modification takes place through ionic interaction.

The "therapeutic agent which has the alkyne group or which is modified with the alkyne group" and/or "therapeutic agent which can adhere to the rGO surface with the π-π interaction," can be an antineoplastic agent in a preferred application of the invention.

The term "antineoplastic agent" mentioned in the invention means the agents used in cancer treatment or relieving of the symptoms or alleviating of the symptoms.

Within the scope of the invention, the antineoplastic agents can be chosen from, but not limited to, a group containing nucleoside analogues, antifolates, other metabolites, topoisomerase I inhibitors, anthracyclines, podophyllotoxins, taxanes, vinca alkaloids, alkylating agents, platinum compounds, antihormones, radiopharmaceuticals, monoclonal antibodies, tyrosine kinase inhibitors, rapamycin mammalian target (mTOR) inhibitors, retinoids, immune system regulators, histonedeacetylase inhibitors and other substances.

The nucleoside analogues can be chosen from, but not limited to, a group containing azacitidine, cladribine, clofarabine, cytarabine, decitabine, floxuridine, fludarabine, fluorouracil (5-FU), gemcitabine, mercaptopurine, nelarabine, pentostatin, thioguanine, trifluridine, and tipiracil.

Antifolates can be chosen from, but not limited to, a group containing methotrexate, pemetrexed, pralatrexed, and raltitrexed.

Other metabolites can be chosen from, but not limited to, a group containing hydroxycarbamide.

Topoisomerase I inhibitors can be chosen from, but not limited to, a group containing irinotecan and topotecan.

Anthracyclines can be chosen from, but not limited to, a group containing daunorubicin, doxorubicin, epirubicin, idarubicin, mitoxantrone, and valrubicin.

Podophyllotoxins can be chosen from, but not limited to, a group containing etoposide and teniposide.

Taxanes can be chosen from, but not limited to, a group containing cabazitaxel, docetaxel, and paclitaxel.

Vinca alkaloids can be chosen from, but not limited to, a group containing vinblastine, vincristine, vindesine, vinflunine, and vinorelbine.

Alkylating agents can be chosen from, but not limited to, a group containing dbendamustine, chlorambucil, dacarbazine, melphalan, streptozotocin, and trabestedin.

Antihormones can be chosen from, but not limited to, a group containing abiraterone, bicalutamide, cyproterone, degarelix, exemestane, fulvestrant, goserelin, histrelin, leuprolide, mifepristone, and triptorelin.

Tyrosine kinase inhibitors can be chosen from, but not limited to, a group containing afatinib, axitinib, bosutinib, cobimetinib, crizotinib, dasatinib, erlotinib, gefitinib, imatinib, lapatinib, nilotinib, osimertinib, pazopanib, ruxolitinib, sunitinib, and vandetanib.

Rapamycin mammalian target (mTOR) inhibitors can be chosen from, but not limited to, a group containing everolimus and temsirolimus.

Retinoids can be chosen from, but not limited to, a group containing alitretinoin, bexarotene, isotretinoin, tamibarotene, and tretinoin.

Immune system regulators can be chosen from, but not limited to, a group containing lenalidomide, pomalidomide, and thalidomide.

Histonedeacetylase inhibitors can be chosen from, but not limited to, a group containing belinostat, panbinostat, valproate, and vorinostat.

Other substances can be chosen from, but not limited to, a group containing anagrelide, ceritinib, dabrafenib, idelalisib, ibrutinib, palbociclib, vemurafenib, bleomycin, bortezomib, dactinomycin, eribulin, estramustine, ixabepilone, mitomycin, procarbazine, alectinib, fluximesterone, iobenguane, imiguimod, interferon, ixazomib, lanreotide, lentinan, octreotide, omacetaxine, tegafur, gimerazil, oteracil, uracil, combrestatin, and chloroquine.

Considering the applications given in this description, the invention is related to a drug-nanocarrier conjugate composed of graphene oxide coated with poly[poly(ethylene glycol methacrylate)-co-(methyl methacrylate)-co-(1-pyrenemethacrylate)-co-(3-azido propyl methacrylate)-graft-poly[(hexyl methacrylate)-co-(dimethylaminoethyl methacrylate)-co-(trimethylaminoethyl methacrylate)] (PAMP-graft-PHDT) polymer, characterized in that it is functionalized covalently with a therapeutic agent and/or targeting agent that has an azide group and/or non-covalently with a therapeutic agent and/or a targeting agent that can adhere to the rGO surface with the π-π interaction (non-covalently).

Another element of the invention is the drug-nanocarrier conjugates of the therapeutic agent, preferably antineoplastic agents, conjugated with the rGO based nanocarrier suitable for the invention covalently or non-covalently.

The drug-nanocarrier conjugates suitable for the invention may optionally contain a targeting molecule conjugated covalently or non-covalently onto the nanocarrier.

In another aspect, the invention is related to polymers shown by formula I for use as an intermediary product in the preparation of the rGO based nanocarrier suitable for the invention.

The invention is also related to drug-nanocarrier conjugates comprising the antineoplastic agents conjugated with an rGO based nanocarrier suitable for the invention covalently or non-covalently, and optionally the targeting agents, for use in the treatment of cancer.

As used within this invention, the terms "treatment" or "treating" means preventing, reducing, alleviating, healing, or blocking of at least one symptom that characterizes a pathological discomfort in a subject who has a disease or who is at risk for a disease. A non-limiting list for different types of cancer is as follows: Carcinomas, carcinomas of solid tissues, squamous cell carcinomas, adenocarcinomas, sarcomas, gliomas, high-grade gliomas, blastomas, neuroblastomas, plasmacytomas, histiocytomas, melanomas, adenomas, hypoxic tumors, myelomas, metastatic cancers or cancers in general. Among the specific types of cancer for the treatment of which the compound disclosed in the invention can be used are B-cell lymphoma, T-cell lymphoma, mycosis fungoides, Hodgkin's Disease, bladder cancer, brain cancer, nervous system cancer, head and neck cancer, squamous cell carcinomas of the head and neck, kidney cancer, small cell lung cancer, and lung cancers such as non-small cell lung cancer, neuroblastoma/glioblastoma, ovarian cancer, pancreatic cancer, prostate cancer, skin cancer, liver cancer, melanoma, squamous cell carcinoma of the mouth, throat, esophagus; colon cancer, cervical cancer, cervical carcinoma, breast cancer, and epithelial cancer, kidney cancer, genitourinary cancer, pulmonary cancer, esophageal carcinoma, head and neck carcinoma, colon cancer, hematopoietic cancers; testicular cancer; colon and Rectal cancers, prostate cancer or pancreatic cancer.

The rGO based drug-nanocarrier conjugates subject to the invention can also be used for the treatment of cervical and anal dysplasias, other dysplasias, severe dysplasias, hyperplasia, atypical hyperplasia, and precancerous conditions such as neoplasia.

As used within this invention, the terms "cancer" and "cancerous" explain a physiological condition characterized by uncontrolled cell growth or points to malign tumors.

In another aspect, the invention is related to pharmaceutical compositions comprising the drug-nanocarrier conjugates that comprise the antineoplastic agents conjugated with the rGO based nanocarrier covalently or non-covalently, and optionally the targeting agent.

The pharmaceutical composition comprises the drug-nanocarrier conjugates that comprise the antineoplastic agents conjugated with the rGO based nanocarrier covalently or non-covalently, and optionally the targeting agent can be in any suitable form based on the preferred method in terms of administration of this composition to a patient. In any situation, the most suitable route of administration will be based on the particular antineoplastic agent in the drug-nanocarrier conjugates subject to the invention, comprising the antineoplastic agents conjugated with the rGO based nanocarrier covalently or non-covalently, the temperament and severity of the disease, and the physical condition of the patient.

The drug-nanocarrier conjugates subject to the invention, comprising the antineoplastic agents conjugated with the rGO based nanocarrier covalently or non-covalently can be administered together with a second active substance chosen from antineoplastic agents or immunomodulatory agents, antiviruses, antimicrobials, or anesthetics, or their dual or triple combinations; e.g. simultaneously, sequentially, or separately.

On the condition that the mentioned second active substance is different than the substance present in the drug-nanocarrier conjugates subject to the invention comprising the antineoplastic agents conjugated with the rGO based nanocarrier covalently or non-covalently, it can be chosen from the antineoplastic agents listed within this specification.

Within the scope of this specification, the term "comprises" is intended to mean 'contains."

Where suitable in the technique, the applications of the invention can be combined.

The applications are described herein in a way to comprise particular characteristics/elements. The description essentially includes other applications which comprise or are composed of the mentioned characteristics/elements.

Technical references such as patents and applications are included in this document by reference.

The applications described herein specifically and in a direct manner can constitute the basis for a disclaimer alone or together with one or more different applications.

Hereinafter, the invention will be described by referencing the following examples, which are given for exemplary purposes only and should not be construed as limiting the scope of the invention in any way.

EXAMPLES

Example 1: poly [poly(ethylene glycol methacrylate)-co-(methyl methacrylate)-co-(1-pyrene methacrylate)-co-(3-azido propyl methacrylate) Graft Copolymer (P(PEGMA-co-AzPMA-co-MMA-co-PMA)); PAMP Synthesis

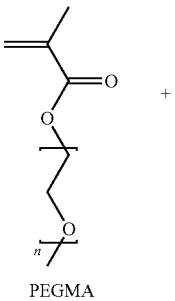
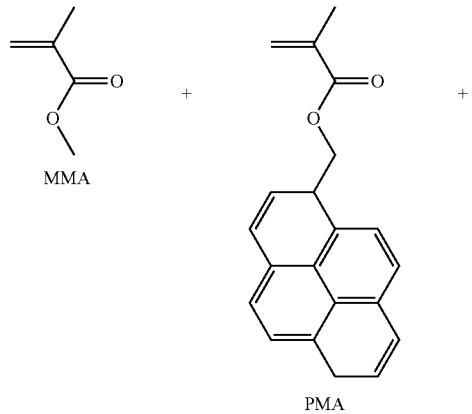

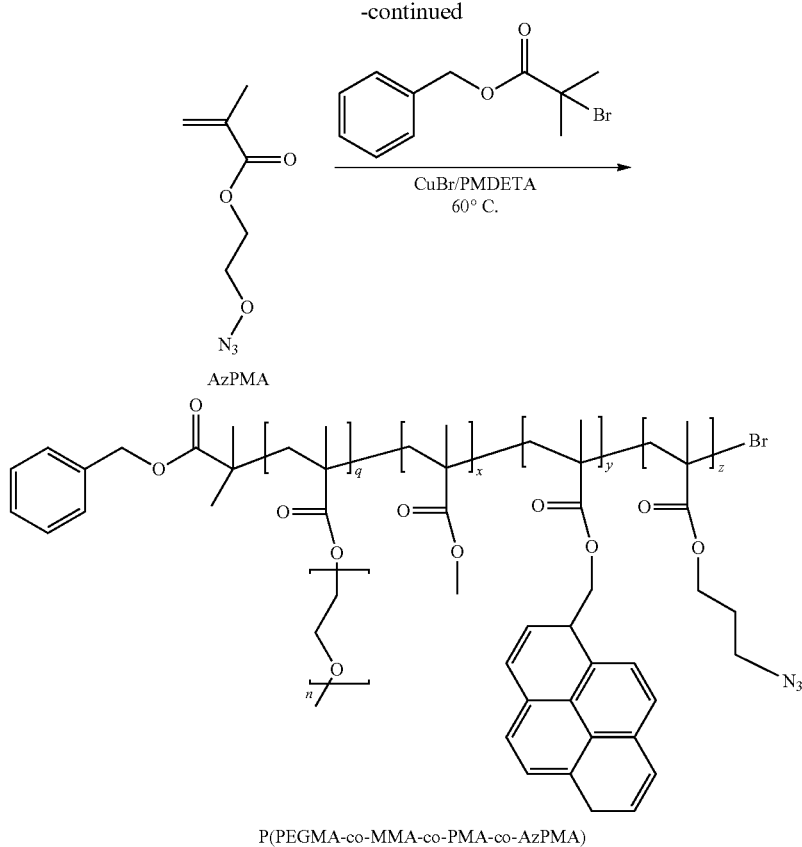

P(PEGMA-co-MMA-co-PMA-co-AzPMA)

In brief, PEGMA (500 or 2000 g/mol) MMA, AzPMA, and PMA having different weight ratios and toluene as a solvent, 10 mL were added to a glass reactor and then, ligand PMDETA and catalyst Cu(I)Br were added. Finally, with the addition of the benzyl-functional ATRP initiator, the reaction mixture was immediately frozen in liquid nitrogen to isolate the reactor from the atmosphere. After the 3-cycle FPT (freeze-pump-thaw), the reaction mixture was placed in an oil bath at 60° C. for 3 hours. After the removal of the catalysts with basic aluminum oxide, the concentrated reaction mixture in THF was precipitated with cold diethyl ether.

Example 2: P(HMA-co-DMAEMA) and P(HMA-co-DMAEMA-co-TMAEMA) Synthesis

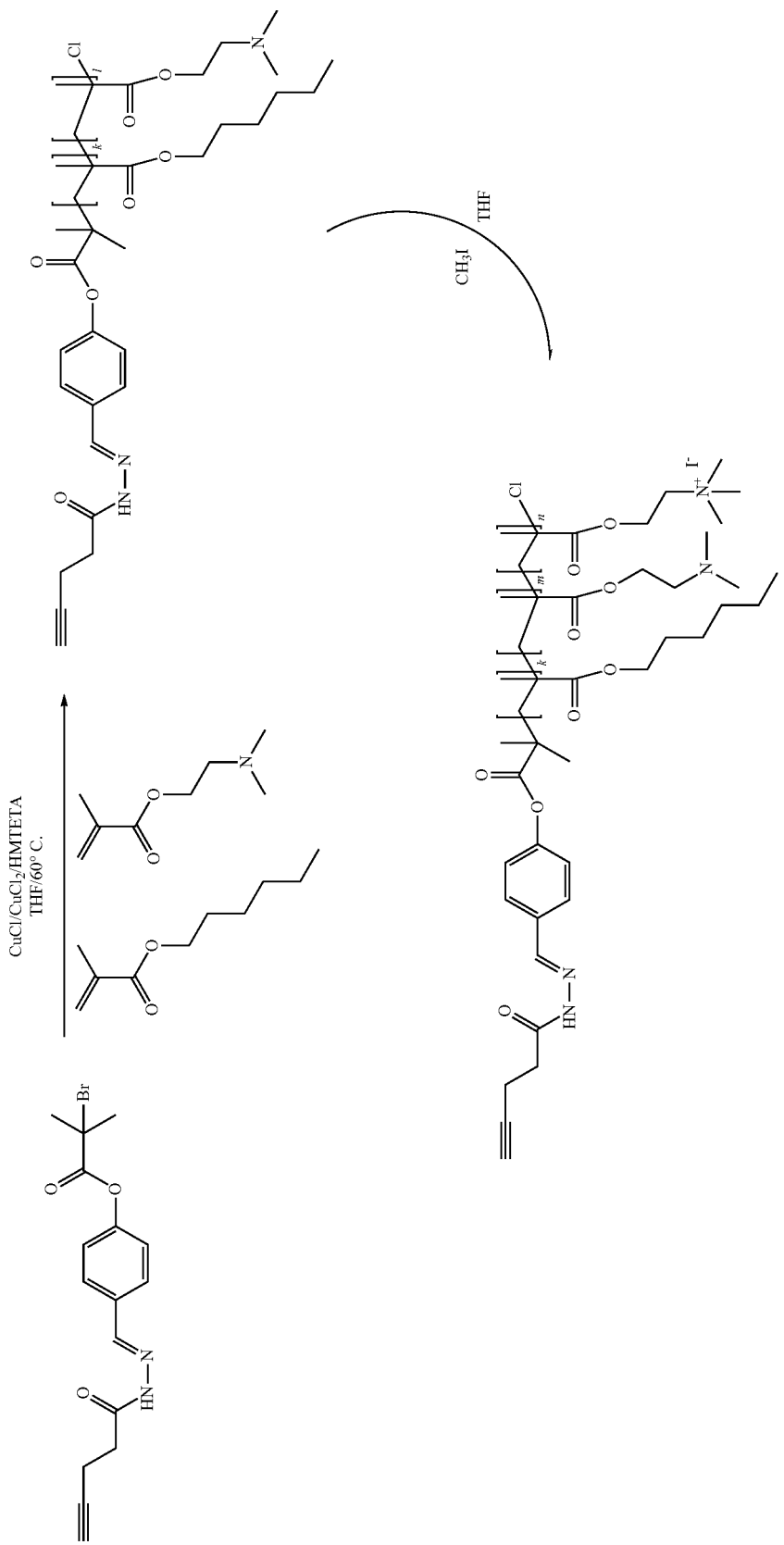

The general synthesis of alkyne-hydrazone-functional ATRP initiator and P(HMA-co-DMAEMA) copolymers were performed by preparing the reactants in two separate glass reactors and then combining the same. In a similar manner, the same reaction can be performed by combining the reactants in a single reactor. In the first reactor, hexyl methacrylate (HMA), 2-(dimethylamino)ethyl methacrylate (DMAEMA), copper (II) chloride ($CuCl_2$), and copper (I) chloride were added and dissolved in THF. In the second glass reactor, 1,1,4,7,10,10-hexamethyltriethylenetetramine (HMTETA) and initiator were dissolved in THF and these two reactors were frozen in liquid nitrogen and after the 3 FPT (freeze-vacuum, melt) cycle, the solution in the reactor that comprises the initiator was transferred with a glass syringe to the first reactor under nitrogen and polymerization was performed at 60° C. for predetermined periods. At the end of the determined period, the reactor was taken from the oil bath and cooled, passed over basic alumina, and the copper was filtered. The reaction mixture whose solvent was evaporated in a rotary evaporator was precipitated in cold hexane.

Half of the repeat units of DMAEMA in the obtained polymer were aimed to be quarternized. Methyl iodide was added to the polymer dissolved in THF under a nitrogen atmosphere and mixed overnight at room temperature. The next day, the THF in the reaction mixture was removed with the rotary evaporator, the remaining reaction mixture was dissolved in water and dialyzed against water by being transferred to dialysis bags having 1 kDa pore width. The P(HMA-co-DMAEMA-co-TMAEMA) (PHDT) dialyzed for two days was obtained by being dried in the freeze dryer. Alternatively, at the end of the reaction, the P(HMA-co-DMAEMA-co-TMAEMA) (PHDT) polymer can be obtained by precipitating the reaction mixture in cold hexane.

Example 3: Grafting of the P(HMA-co-DMAEMA-co-TMAEMA) Polymer to the P(PEGMA-co-AzPMA-co-MMA-co-PMA) Polymer and Obtaining the PAMP-Graft-PHDT Polymer In the reaction targeting the 3 azide groups on the PAMP copolymer, PAMP and PHDT copolymers were dissolved in a glass reactor in PBS respectively and copper (II) sulphate (1.5 eq) was added on the same, after adding sodium ascorbate (4.5 eq), the reaction mixture was frozen with liquid nitrogen and left overnight at room temperature, following the 3 FPT cycle. The next morning, with the purpose of closing the azide groups which have not reacted, propargyl alcohol was added under nitrogen and the PAMP copolymer optionally grafted with the cationic copolymer after approximately 5 hours was taken to a dialysis bag having 3.5 kDa pore width and dialyzed for 3 days against distilled water. The graft copolymer was obtained after the dialysis was dried in a freeze dryer. When the $^1$H NMR result of the graft copolymer obtained is reviewed, the signals from the two copolymers can be seen clearly. From these signals, by using the methylene signal of the pyrene group at 5.71 ppm, the methylene neighboring the dimethylamino group at 2.56 ppm, and the ratio between the methyl protons at 2.27 ppm, an average 4.62 P(HMA-co-DMAEMA-co-TMAEMA) binding was determined.

Example 4: PAMP-Graft-PHDT Coating on Graphene Oxide and In Situ Reduction of Graphene Oxide; PAMP-Graft-PHDT-rGO It was aimed to coat the graphene plates with PAMP-graft-PHDT graft copolymers comprising pyrene comprising PEG and π bonds, and also, to transform to reduced graphene oxide by reducing during coating. In the paper published by Demirel et al., the optimization of this step is described in detail. In brief, graphene oxide (GO) solution (4 mg/mL), reducing agent hydrazine, and GO/copolymer: 1/10 (g/g) coating rate was obtained. The solvent system was sorted as $H_2O$:DMF/2:1 (mL/mL). In the beginning, the reaction mixture was mixed for 2 hours at room temperature. Then, after the addition of 1 µL hydrazine hydrate or 1 mg GO, the reaction was continued for 20 hours at 80° C. After the purification steps for removing the DMF and hydrazine after coating, the plates were distributed, and the uncoated copolymer was washed with water and then in acetone, which is a good solvent for the copolymer, several times. The reaction mixture was centrifuged at 14,000 rpm for 15 minutes and the supernatant was discharged. GO surface π-π interaction was obtained between the precipitate centrifuged with the pyrene group on the copolymer, and the PEG functional copolymer as graphene plates coated with PEG functional copolymer. By using the thermal action of the rGO and the copolymer, which has already been researched, the coating efficiency % of the copolymer on the rGO plates was calculated.

Example 5: Drug Loading to the PAMP-Graft-PHDT Coated rGO Nanoplatforms; PAMP-graft-PHDT-rGO-Dox Doxorubicin-HCl was loaded onto the PAMP-graft-PHDT-rGO surface through π-π stacking.

Therapeutic loading was applied by adding 10 mg Dox to 10 mg PAMP-graft-PHDT-rGO nanocarriers. PAMP-graft-PHDT-rGO and doxorubicin 10 mL were dispersed by ultrasonication in a PBS solution with pH 8 comprising 10% DMSO by volume and stirred overnight at 35° C. The reaction mixture was centrifuged at 14,000 rpm or 15 minutes, the supernatant was discharged, and collected for the loaded drug amount assay. PAMP-graft-PHDT-rGO-Dox composition was dispersed 3 times with the pH 8 PBS solution to dispose of the unbound drug and 3 times with distilled water to dispose of the ions from the PBS, then centrifuged. Then, PAMP-graft-PHDT-rGO-Dox was dispersed in distilled water and frozen with liquid nitrogen, and the solution was freeze-dried overnight.

In order to obtain the PAMP-graft-PHDT-rGO-Dox-drug-nanocarrier conjugate in the above examples; the rGO surface was first modified with PAMP-graft-PHDT polymer and then, doxorubicin, which is a drug molecule, was loaded through do π-π stacking.

Another method for obtaining the same product is in-situ reducing of the GO to rGO as the PAMP polymer of the graphene oxide surface is modified, and then, grafting of the PHDT graft polymer to the PAMP polymer coated with rGO with click reaction, and obtaining the PAMP-rGO-PHDT-Doxorubicin drug-nanocarrier conjugate by loading the doxorubicin to the obtained PAMP-rGO-PHDT nanocarrier through π-π stacking.

Example 6: Anticancer Effect of the Nanocarrier

With the purpose of detecting the cell viability, a 96-well plate with a transparent bottom and dark walls was coated with poly-L-lysine and 10.000 cells were cultured in each well, and incubated overnight. The growth medium was removed from the top of the cells adhering to the well bottom, washed with PBS, and nanoparticle solutions were added at different concentrations to the growth medium.

After a predetermined period (24 or 48 hours), the cells were washed with PBS again and the growth medium comprising 5% resazurin solution was added to the cells, incubated for 2 hours. Then, each well was stimulated at 550 nm and the fluorescence strengths at 590 nm were recorded by reading the plate bottom, and the cell viability was determined by comparing the obtained values with the positive control.

Figure 2:
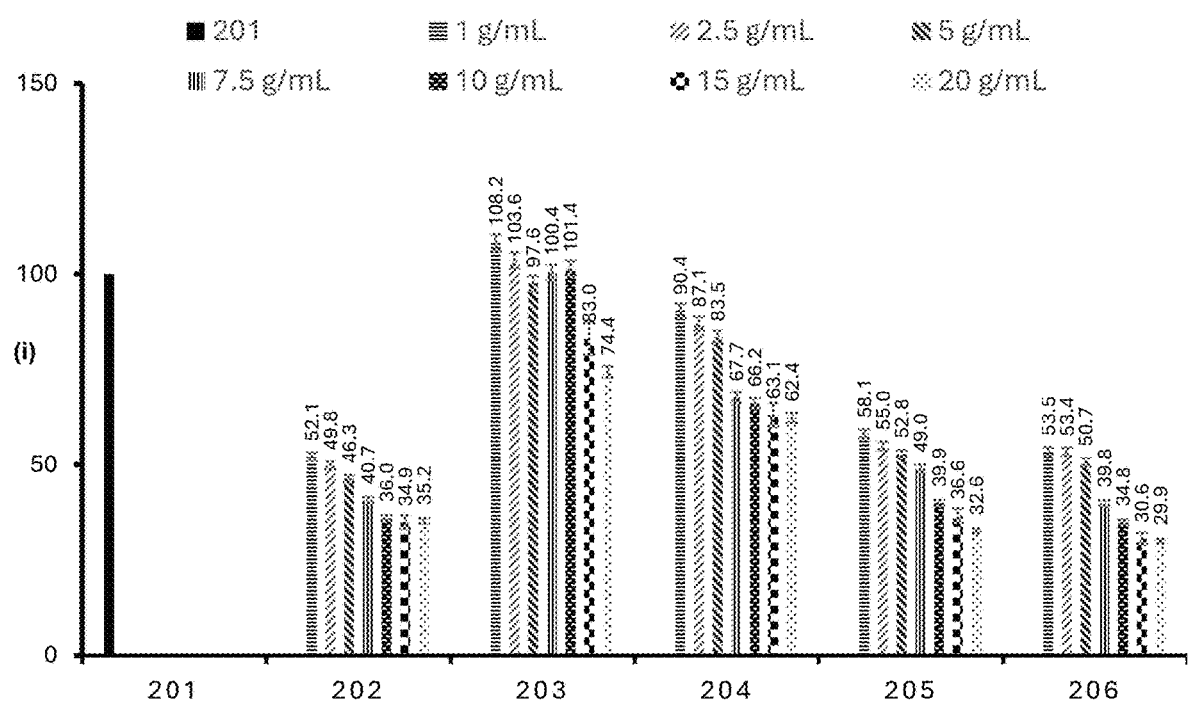

In the cell viability experiments with MDA-MB-231 cells, a decrease was determined in cell viability with increasing concentration, and after treatment with nanoparticles for 24 hours, the highest cell mortality was caused by targeted, anti-cancer drug and siRNA loaded (PAMP)$_{PEG2000}$-graft-PHDT-rGO-EPPT1-Doxorubicin-siRNA (206), while (PAMP)$_{PEG2000}$-graft-PHDT-rGO-siRNA (203) composition did not cause considerable toxicity (FIG. 2). On the other hand, after the nanoparticle treatment period was increased to 48 hours, when the (PAMP)$_{PEG2000}$-graft-PHDT-rGO-EPPT1 (204) composition was compared with the (PAMP)$_{PEG2000}$-graft-PHDT-rGO-siRNA (203) composition which does not carry targeting agent, EPPT1 with the biocompatibility additive was determined to be more biocompatible than its non-targeted equivalent (FIG. 2).

The invention claimed is:

1. A reduced graphene oxide (rGO) nanocarrier comprising:
    reduced graphene oxide coated with a coating of poly[poly (ethylene glycol methacrylate)-co-(methyl methacrylate)-co-(1-pyrenemethacrylate)-co-(3-azidopropyl methacrylate)]-graft-poly [(hexyl methacrylate)-co-(dimethylaminoethyl methacrylate)-co-(trimethylaminoethyl methacrylate)] (PAMP-graft-PHDT) copolymer.

2. The rGO nanocarrier of claim 1, wherein the PAMP-graft-PHDT copolymer has the structure of Formula I, Formula I

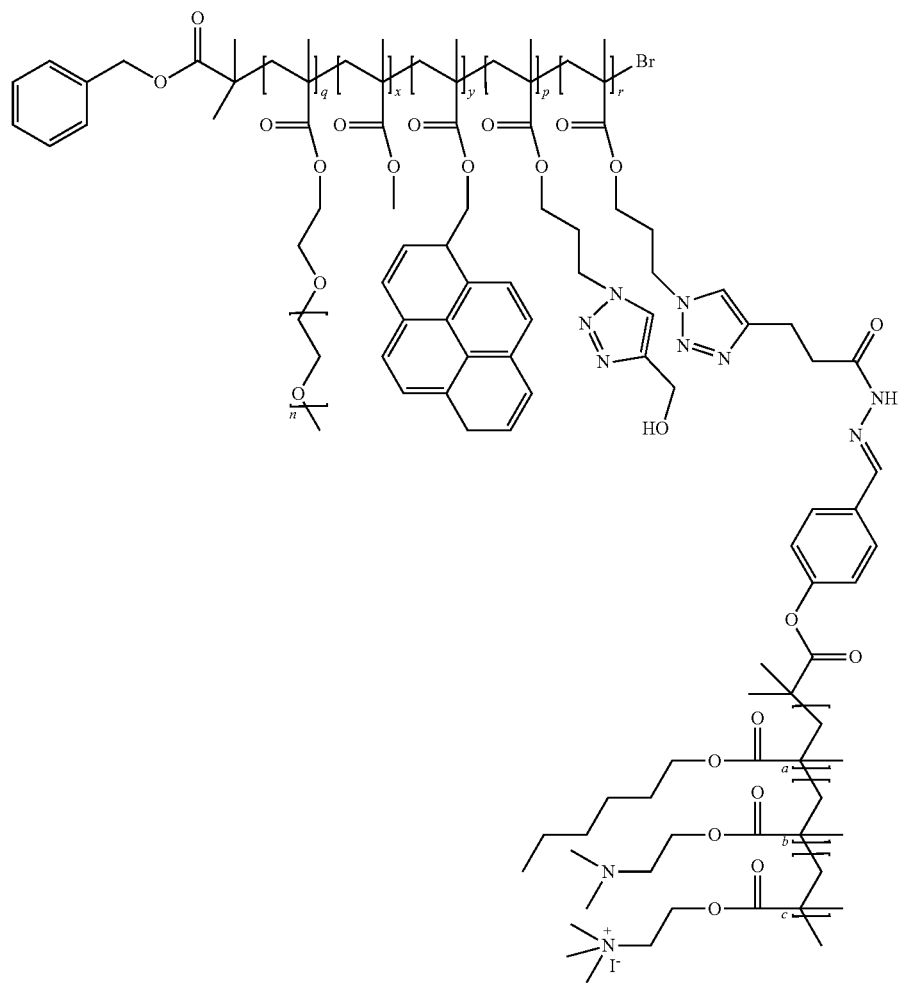

wherein n is a natural number between 1 to 200 and p, q, r, x, y, a, b, and c are independently natural numbers between 1 to 50.

3. The rGO nanocarrier of claim 1, which has been further functionalized with a molecule that comprises an alkyne group.

4. The rGO nanocarrier of claim 3, wherein the molecule that comprises an alkyne group comprises a targeting agent or a therapeutic agent, and wherein the targeting agent or therapeutic agent either has the alkyne group or has been modified to include the alkyne group.

5. The rGO nanocarrier of claim 4, wherein the therapeutic agent that either has the alkyne group or that has been modified to include the alkyne group is an antineoplastic agent.

6. The rGO nanocarrier of claim 1, wherein the rGO nanocarrier has been functionalized with an agent that can adhere to an rGO surface with a π-π interaction.

7. The rGO nanocarrier of claim 1, wherein the rGO nanocarrier has been functionalized with an agent that can adhere to an rGO surface with ionic interactions.

8. A polymerization initiator shown by the following formula:

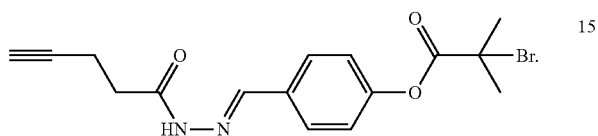

* * * * *